United States Patent [19]

Shah et al.

[11] Patent Number: 5,796,976

[45] Date of Patent: Aug. 18, 1998

[54] TEMPORARY STORAGE HAVING ENTRIES SMALLER THAN MEMORY BUS

[75] Inventors: Bhavin Shah, Mountain View, Calif.; Era Nangia, Austin, Tex.; Gilbert Wolrich, Framingham; Nital Patwa, Marlboro, both of Mass.

[73] Assignee: Digital Equipment Corporation, Maynard, Mass.

[21] Appl. No.: 590,214

[22] Filed: Jan. 23, 1996

Related U.S. Application Data

[63] Continuation of Ser. No. 58,286, May 4, 1993, abandoned.

[51] Int. Cl.[6] .............................. G06F 13/00; G06F 13/14
[52] U.S. Cl. ........................ 395/403; 364/DIG. 1; 364/DIG. 2; 364/239; 364/240; 364/240.3; 395/280; 395/250; 395/876; 395/882
[58] Field of Search ..................... 364/240, DIG. 1, 364/DIG. 2; 395/250, 284, 280, 500, 800, 403

[56] References Cited

U.S. PATENT DOCUMENTS

| | | | |
|---|---|---|---|
| 4,347,567 | 8/1982 | Detar, Jr. et al. | 395/425 |
| 4,683,534 | 7/1987 | Tietjen et al. | 395/425 |
| 4,750,154 | 6/1988 | Lefsky et al. | 395/425 |
| 4,805,098 | 2/1989 | Mills, Jr. et al. | 325/250 |
| 4,959,771 | 9/1990 | Ardini, Jr. et al. | 395/425 |
| 5,019,965 | 5/1991 | Webb, Jr. et al. | 395/425 |
| 5,113,369 | 5/1992 | Kinoshita | 395/325 |
| 5,301,281 | 4/1994 | Kennedy | 395/325 |
| 5,313,582 | 5/1994 | Hendel et al. | 395/250 |
| 5,459,842 | 10/1995 | Begun et al. | 395/250 |
| 5,471,632 | 11/1995 | Gavia et al. | 395/284 |

OTHER PUBLICATIONS

David A. Patterson et al., "Computer Architecture A Quantitative Approach", pp. 410–490, Morgan Kaufman Publishers, Inc.

Norman P. Jouppi, "Cache Write Policies and Performance", WRL Research Report, Dec. 1991.

*Primary Examiner*—Tod R. Swann
*Assistant Examiner*—Tuan V. Thai
*Attorney, Agent, or Firm*—Arthur W. Fisher; Ronald C. Hudgens; Diane C. Drozenski

[57] ABSTRACT

Information is stored in temporary storage and subsequently transferred to a memory over a bus. The temporary storage is provided with a plurality of entries each of which has a selected size that is smaller than a size of the bus. Information that is designated for a common area of the memory is stored in different entries, and the different entries are linked. Before being transferred to memory, the information from linked entries is assembled. The assembled information is then transferred over the bus to memory. Embodiments of the temporary storage include a write queue and a write buffer.

30 Claims, 7 Drawing Sheets

5,796,976

TEMPORARY STORAGE HAVING ENTRIES SMALLER THAN MEMORY BUS

This is a continuation of application Ser. No. 08/058,286, filed May 4, 1993, now abandoned.

BACKGROUND OF THE INVENTION

This invention relates to implementing internal storage in microprocessors, and in particular to implementing area efficient internal storage for use in writing information from the microprocessor to memory.

A computer system typically includes a microprocessor and memory. The microprocessor performs numerous operations, one of which is writing information from the microprocessor to memory. An internal cycle is the time required to perform most processing operations, and a write cycle is the time required to write information from the microprocessor to memory. Because the microprocessor typically operates much faster than memory, a write cycle often spans several internal cycles.

To reduce the effect of write operations on the number of operations the microprocessor can perform in a given period, microprocessor designers often use internal storage as an interface between a processing element of the microprocessor and memory. To write information to memory, the processing element sends the information to the internal storage. The processing element then proceeds with additional operations while the internal storage performs the actual write operation. Examples of the internal storage include write queues and write buffers.

SUMMARY OF THE INVENTION

The invention provides an area efficient internal storage for temporarily storing information being written to memory over a bus by a processing element. In one general aspect of the invention, the internal storage includes a number of entries for temporarily storing information, with the size of each entry being smaller than the size of the bus. When the internal storage receives information from the processing element that is designated for a common area of memory (i.e., a single entry in memory), the internal storage stores the information in different entries and establishes a link between the entries. The internal storage then assembles the information from the linked entries and transfers the assembled information over the bus.

The invention offers several advantages over typical internal storages. Because the entry sizes of an internal storage according to the invention are smaller than the size of the bus (rather than being equal to the size of the bus as is true in typical internal storages), the area occupied by an internal storage according to the invention is substantially smaller than the area occupied by a typical internal storage. The reduction in the area occupied by the internal storage is tremendously important because microprocessor designers can use the area that would have been occupied by a larger internal storage to implement other features.

The reduction in the area occupied by the internal storage minimally impinges on the performance of the internal storage. When the processing element transfers information in blocks that are equal to or smaller than the size of the entries in the internal storage, the reduced size of the entries has little, if any, effect on the performance of the internal storage. Indeed, in this case, the internal storage uses the area it occupies more efficiently than a typical internal storage. When the processing element transfers information in blocks that equal the size of the bus (or exceed the size of the entries in the internal storage), the invention ensures that the number of write cycles needed to write the information to memory is not increased. The invention does this by linking entries containing information designated for a common area of memory and assembling the information from linked entries prior to transfer over the bus.

Preferred embodiments of the invention include the following features.

The processing element sends information to the internal storage in packets, each of which is designated by an address. The internal storage determines whether the information in different packets is designated for a common area of memory based on the addresses associated with the packets. When a packet is received, the internal storage stores the packet in a first entry. If the address of the packet is related to the address of a previously received packet that is stored in a second entry, the internal storage establishes a link between the first and second entries. For example, if the packet in the first entry and the packet in the second entry identify different portions of a single entry of memory, the internal storage establishes a link between the two entries.

When the internal storage transfers information to memory, the internal storage removes a first packet of information from a first entry and determines whether a link has been established between the first entry and another one of the entries. If so, the internal storage removes a second packet of information from the entry linked to the first entry, and transfers the first and second packets to memory in a single write cycle. If not, the internal storage transfers the first packet to memory.

In one embodiment, the internal storage is implemented as a queue that stores and removes packets in first-in-first-out order. As the queue receives packets of information, it determines whether the address of a currently received packet is related to the address of the previously received and stored packet and, if the addresses are related, establishes a link between the entries in which the two packets are stored. The queue establishes the link, for example, by setting a field associated with the entry containing the previously received packet to a predetermined condition. When the queue transfers information to memory, the queue removes a first packet of information from an entry and examines the field associated with the entry. If the field is set to the predetermined condition, the queue removes a second packet of information from the next entry and transfers the first and second packets to memory in a single write cycle. If not, the queue transfers the first packet to memory.

In another embodiment, the internal storage is implemented as a write buffer that stores and removes packets in an order that is not dependent on the order in which the packets are received. As the write buffer receives packets, the write buffer determines if the address of a currently received packet is related to the address of a previously received and stored packet and, if the addresses are related, establishes a link between the entries in which the currently received packet and the related previously received packet are stored. The write buffer establishes the link by using a field associated with one of the entries in which the currently received packet and the previously received packet are stored to indicate that the entries are linked and providing that entry with an index that identifies the entry in the write buffer to which that entry is linked.

For example, the field is set to a predetermined condition, and the index identifies the position in the write buffer of the entry containing the related information. When the buffer transfers information to memory, the buffer removes a first packet of information from an entry and examines the field associated with the entry. If the field is set to the predetermined condition, the write buffer removes a second packet of information from the entry identified by the index and transfers the first and second packets to memory in a single write cycle. If not, the buffer transfers the first packet to memory.

Other features and advantages of the invention will become apparent from the following detailed description, and from the claims.

DESCRIPTION OF THE PREFERRED EMBODIMENT

Figure 1:
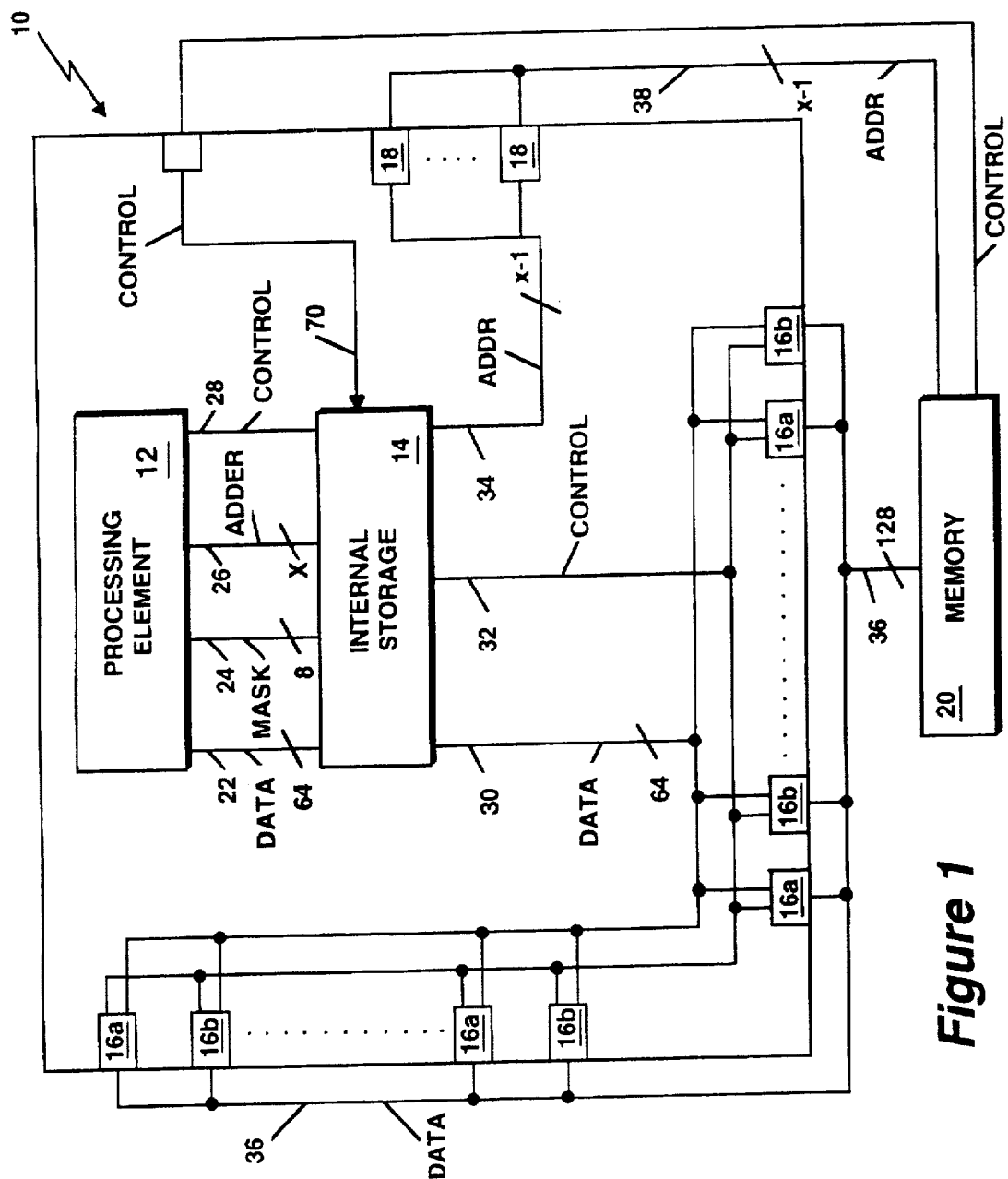
FIG. 1 shows a microprocessor and its interface with memory according to the invention.

As shown in FIG. 1, a microprocessor 10 includes a processing element 12 and an internal storage 14. To write data to memory 20, processing element 12 sends a write packet to internal storage 14. The write packet includes data sent via internal data bus 22, and an address sent via internal address bus 26.

Internal storage 14 acts as a staging area for up to N entries of data, and thereby increases the efficiency of the write operation. Write operations to memory 20 typically take several internal clock cycles to complete. By holding multiple packets of data, internal storage 14 avoids write operations from tying up processing element 12, and thereby allows processing element 12 to continue processing while write operations are occurring.

After receiving a write packet, internal storage 14 writes the data to memory 20 via an internal data write bus 30, data pads 16, and an external data write bus 36. Similarly, internal storage 14 writes address information to memory 20 via an internal address write bus 34, address pads 18, and an external address write bus 38.

The data entries of internal storage 14 are half as wide as external data write bus 36. The data entries of internal storage 14 and internal data write bus 30 are 64 bits wide. External data write bus 36 is 128 bits wide, and there are 128 data pads 16. Because internal data write bus 30 has half as many bits as there are data pads 16, data pads 16 are divided into two groups of 64 bits (16a and 16b). Each 64 bit group is designated as a quadword. A quadword select signal 32 from internal storage 14 controls which group of pads (16a or 16b) receives a quadword of data from internal data write bus 30 at any particular time.

Internal storage 14 is area efficient because its width is reduced relative to external write bus 36 without increasing the number of write cycles needed to write data to memory 20. In cases where processing element 12 performs memory writes to 64 or less consecutive bits, the reduced width of internal storage 14 does not impact the number of write cycles needed to write data to memory 20. By comparison, if internal storage 14 were 128 bits wide, half of the 128 bits would not be used in those cases.

Moreover, the number of write cycles needed to write data to memory 20 is not increased when processing element 12 writes to more than 64 consecutive bits. An octaword is a group of 128 bits and is composed of two quadwords. As described in detail below, when processing element 12 sends consecutive write packets to different quadwords of a single octaword, internal storage 14 loads the first packet of data into the appropriate group of pads (16a or 16b), but delays writing the data to memory 20. Internal storage 14 then loads the second packet of data into the other group of pads (16b or 16a) and writes both packets of data to memory 20 in a single write cycle on external write bus 36.

Figure 2:
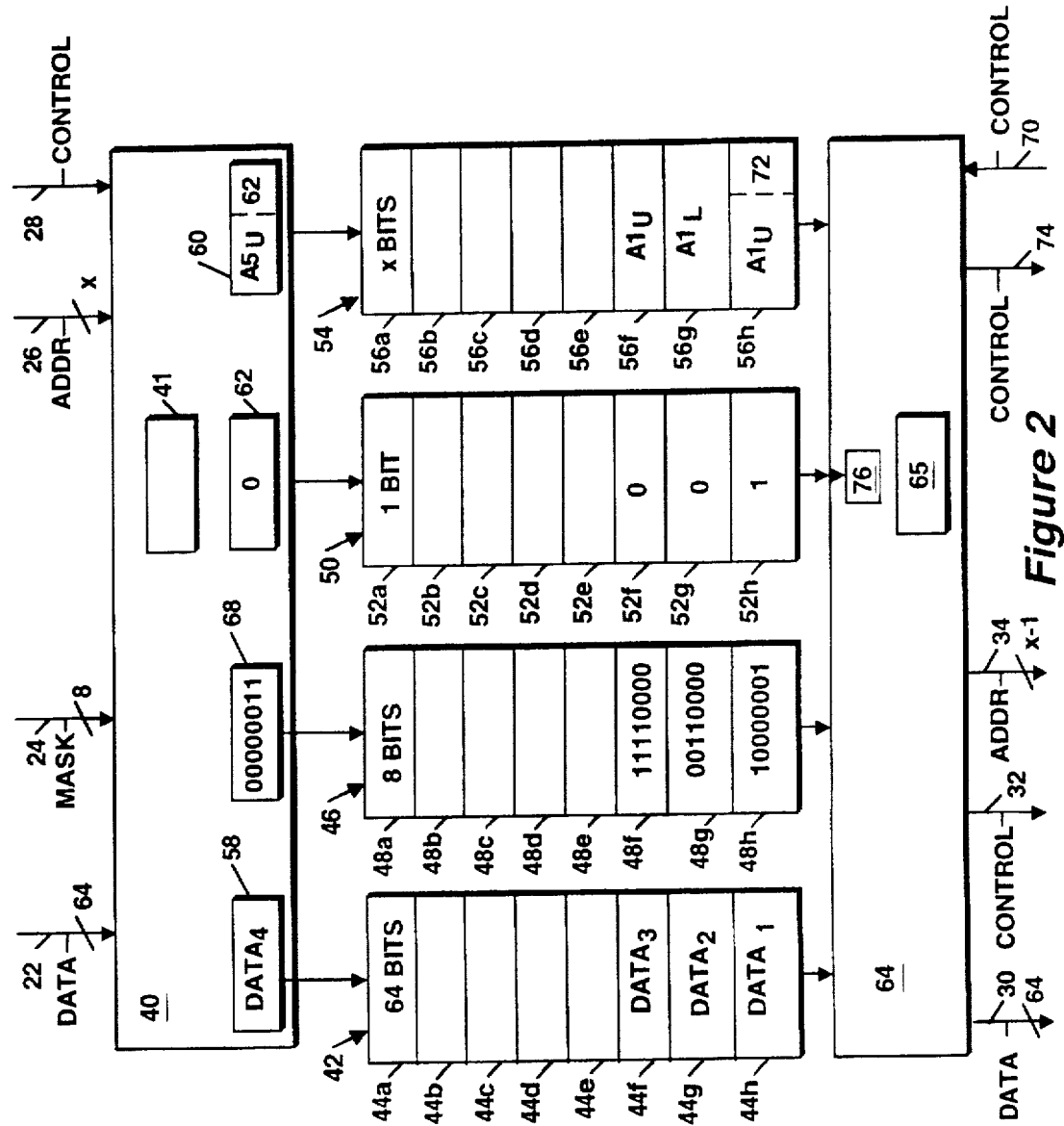
FIG. 2 shows a write queue according to one embodiment of the invention.

Referring also to FIG. 2, in one embodiment of the invention, internal storage 14 (FIG. 1) is implemented as a write queue 14a (FIG. 2). Queue 14a includes a data queue 42 that temporarily stores the data from write packets sent by processing element 12. Data queue 42 includes eight entries 44a–44h (i.e., N=8). As noted above, each of entries 44a–44h is 64 bits wide.

In operation, data propagates through data queue 42 as follows. Data entering data queue 42 is placed in the entry 44 designated by an input pointer 41. For example, if pointer 41 is set to "8", data is placed in the eighth entry 44h. After data is entered in data queue 42, input pointer 41 is decremented. If input pointer 41 is decremented to "0", input pointer 41 is set to "8", which allows input pointer 41 to continually cycle through data queue 42. Data is removed from the entry 44 of data queue 42 designated by an output pointer 65. After data is removed from the entry 44 designated by output pointer 65, output pointer 65 is decremented. Like input pointer 41, output pointer 65 is set to "8" if output pointer 65 is decremented to "0". Data removed from data queue 42 is transferred to data pads 16 in the manner described above.

An address queue 54 stores the addresses that correspond to the data stored in data queue 42. Address queue 54 includes eight entries 56a–56h, each of which corresponds to an entry 44a–44h in data queue 42. Thus, for example, the address in entry 56c of address queue 54 always corresponds to the data in entry 44c of data queue 42.

Queue 14a also includes a write packer 40 that acts as the interface between data queue 42 and internal data bus 22, and between address queue 54 and internal address bus 26. Write packer 40 stores data arriving on internal data bus 22 in a data register 58, and address information arriving on internal address bus 26 in an address register 60.

When processor 12 sends a new write packet to queue 14a, write packer 40 compares the address on internal address bus 26 with the contents of address register 60. If the address on internal address bus 26 is identical to the contents of address register 60, the packet presently in data register 58 and the packet on internal data bus 22 ("the consecutive write packets") are directed to a single quadword. If only the least significant bit 62 of address register 60 differs from the address on internal address bus 26, the consecutive write packets are directed to different quadwords of a single octaword. If one or more bits other than the least significant bit 62 of the contents of address register 60 differs from internal address bus 26, the consecutive write packets are directed to different octawords.

When the consecutive write packets are directed to a single quadword, write packer 40 consolidates these packets by merging valid data from internal data bus 22 with the contents of data register 58. Each write packet sent by processing element 12 via internal data bus 22 includes 64 bits of data. However, all 64 bits of data may not be valid in each packet. To indicate which bits are valid, processing element 12 includes a valid mask 24 in each write packet. Valid mask 24 includes eight bits. The state of each bit of valid mask 24 indicates whether a corresponding byte (eight bits) of data on internal data bus 22 is valid. Thus, write packer 40 consolidates packets by adding the bits whose validity is indicated by valid mask 24 to data register 58. The consolidation performed by write packer 40 reduces the number of write operations actually performed (without consolidation, each packet would require a separate write operation), and thereby improves the efficiency of the write operation.

When consecutive write packets are directed to different quadwords of a single octaword, write packer 40 indicates the relationship between the write packets by setting an entry 52 in a same octaword queue 50. Same octaword queue 50 includes eight single bit entries 52a–52h, each of which corresponds to an entry 44a–44h in data queue 42. Write packer 40 also transfers the contents of data register 58 to the entry 44 of data queue 42 designated by input pointer 41, and transfers the contents of address register 60 to the corresponding entry 56 of address queue 54. For example, if input pointer 41 were set to "7", write packer 40 would transfer the contents of data register 58 to entry 44g of data queue 42. Next, write packer 40 sets the corresponding entry 52 in same octaword queue 50. By setting entry 52, write packer 40 indicates that the previously empty entry 44 is associated with the data to be stored in data register 58 (i.e., the incoming write packet). Thereafter, write packer 40 stores data from internal data bus 22 in data register 58 and address information from internal address bus 26 in address register 58. Finally, write packer 40 decrements input pointer 41.

When consecutive write packets are directed to different octawords, write packer 40 transfers the contents of data register 58 to the entry 44 designated by input pointer 41, transfers the contents of address register 60 to the corresponding entry 56 of address queue 54, and decrements input pointer 41. In this case, write packer 40 does not set the corresponding entry 52 in same octaword queue 50.

By setting entry 52 in same octaword queue 50 only when consecutive writes are directed to different quadwords of a single octaword, write packer 40 ensures that the reduced area of data queue 42 does not impinge on the efficiency of queue 14a. Upon transferring data from the entry 44 designated by input pointer 41 to the appropriate group of data pads (16a or 16b), an output circuit 64 of queue 14a examines the entry 52 of same octaword queue 50 designated by input pointer 41. If the entry 52 is not set, output circuit 64 writes the data on data pads 16 to memory. If the entry 52 is set, meaning that the contents of the next entry 44 of data queue 42 (or, if the next entry 44 is empty, the contents of data register 58) are directed to the same octaword as the contents of the entry 44 designated by input pointer 41, output circuit 64 delays writing the data on data pads 16 to memory 20 until output circuit 64 has also transferred the contents of the next entry 44 (or data register 58) to the appropriate group of data pads (16b or 16a). Output circuit 64 transfers the contents of the next entry 44 by decrementing output pointer 65 so that output pointer 65 points to the next entry 44. Thereafter, output circuit 64 transfers the contents of the entry 44 then designated by output pointer 41 in the manner described above. Similarly, if the entry 44 designated by output pointer 41 is empty, output circuit 64 waits for write packer 40 to transfer the contents of data register 58 to the entry 44 designated by input pointer 41 (which, in this case, equals output pointer 65), and then transfers the new contents of the entry designated by output pointer 65 in the manner described above. Thus, use of same octaword queue 50 ensures that consecutive write packets to a single octaword only require a single write operation. This, in turn, ensures that the 64 bit wide data queue 42 provides comparable performance to a 128 bit wide data queue.

Figure 3:
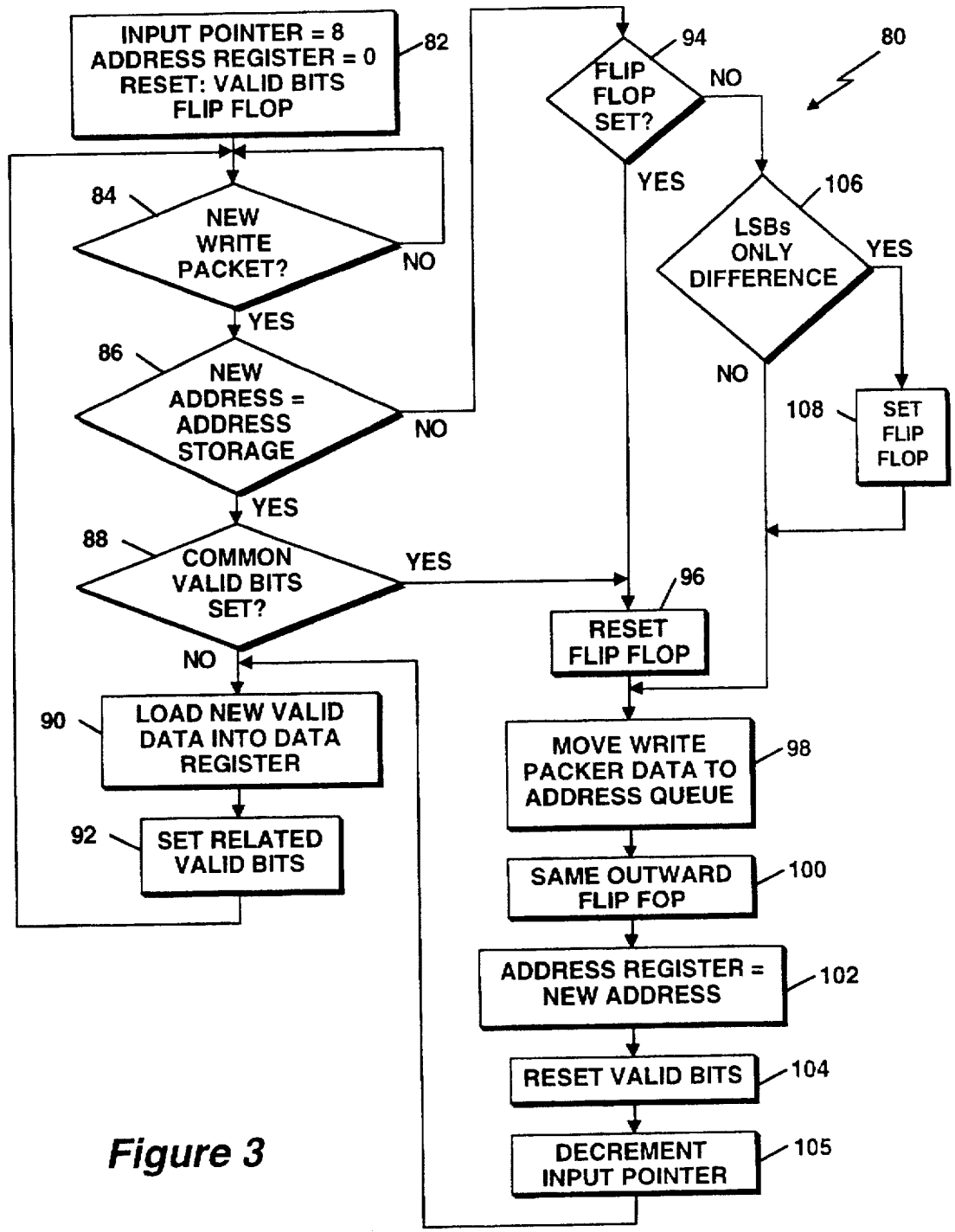
FIG. 3 is a flow chart that shows the procedure for writing data to the write queue of FIG. 2.

FIG. 3 shows the procedure 80 performed by write packer 40. On startup, write packer 40 sets input pointer 41 to "8", clears the address register 60, resets a flip flop 66, and clears a valid bit register 68 (step 82). As discussed below, write packer 40 uses the state of flip flop 66 to determine when to set entries 52 in same octaword queue 50. As also discussed below, write packer 40 uses the contents of valid bit register 68 to monitor which bits in data register 58 are valid.

After startup, write packer 40 waits (step 84) to receive a control signal 28 from processing element 12 which indicates that a new write packet has arrived. When a new write packet arrives, write packer 40 compares the address on internal address bus 26 with the contents of address register 60 (step 86). If the address on internal address bus 26 is identical to the contents of address register 60, this means that the data on internal data bus 24 and the data in data register 58 are directed to a single quadword. In this case, write packer 40 compares valid mask 24 with the contents of valid bit register 68 (step 88).

If no common bits are set in both valid mask 24 and valid bit register 68, write packer 40 merges the valid data from internal data bus 22 (as indicated by valid mask 24) into the contents of data register 58 (step 90). Next, write packer 40 sets the bits in valid bit register 68 that are set in valid mask 24. Finally, write packer 40 proceeds to step 84 and waits for the next new write packet to arrive.

If common bits are set in both valid mask 24 and valid bit register 68, write packer 40 treats the new write packet as if it were addressed to a different octaword than the octaword in data register 58. To do so, write packer 40 proceeds to step 96, which is discussed below. By treating new write packets that would overwrite valid data as if they were addressed to a different octaword, write packer 40 ensures that valid data will never be overwritten. It should be appreciated that this result is not required; the invention would function satisfactorily if valid data could be overwritten by other valid data.

If the contents of internal address bus 26 differ from the contents of address register 60 (step 86), write packer 40 determines whether write packer 40 is permitted to set the entry 52 in same octaword queue 50 that corresponds to the entry 44 designated by input pointer 41 by examining the state of flip flop 66 (step 94). Write packer 40 cannot set two consecutive entries 52 in same octaword queue 50. For example, when entry 52h is set to "1", entry 52g cannot be set to "1" and must remain at "0". As is discussed below with respect to the procedure performed by output circuit 64, setting two consecutive entries 52 in the same octaword queue 50 would risk overwriting valid data on data pads 16. The state of flip flop 66 indicates whether write packer 40 set an entry 52 in same octaword queue 50 when write packer 40 most recently transferred data from data register 58 to an entry 44 in data queue 42. If flip flop 66 is not set, this indicates that write packer 40 did not set an entry 52 in same octaword queue 50 when write packer 40 last transferred data from data register 58 to data queue 42. Thus, if flip flop 66 is not set, write packer 40 is permitted to set the entry 52 in same octaword queue 50 designated by input pointer 41, because to do so would not result in consecutive entries 52 being set.

If flip flop 66 is not set, write packer 40 compares the address on internal address bus 26 with the contents of address register 60 to determine if the contents of address register 60 differ from internal address bus 26 only in the least significant bit 62 of address register 60 (step 106). If so, then the contents of data register 58 and internal data bus 22 are directed to different quadwords of a single octaword. In this case, write packer 40 sets flip flop 66 (step 108). If the contents of address register 60 differ from internal address bus 26 in bits other than the least significant bit 62 of address register 60, then the contents of data register 58 and the data on internal data bus 22 are directed to different octawords.

If write packer 40 determines that flip flop 66 is set (step 94), this indicates that write packer 40 set an entry 52 in same octaword queue 50 when write packer 40 most recently transferred data from data register 58 to an entry 44 in data queue 42. Thus, if flip flop 66 is set, write packer 40 cannot set an entry 52 in same octaword queue 50. Because write packer 40 cannot set an entry 52 in same octaword queue 50 during this transfer of data from data register 58 to an entry 44 in data queue 42, write packer 40 resets flip flop 66 (step 96).

After resetting flip flop 66 because consecutive entries 52 in same octaword 50 cannot be set (step 96), determining that the contents of data register 58 and the data on internal data bus 22 are directed to different octawords (the "no" result of step 106), or setting flip flop 66 to indicate that the contents of data register 58 and the data on internal data bus 22 are directed to different quadwords of a single octaword and that an entry 52 in same octaword queue 50 should be set (step 108), write packer 40 transfers the contents of data register 58 to the entry 44 designated by input pointer 41 (step 98). At the same time, write packer 40 transfers the contents of address register 60 to the corresponding entry 56 of address queue 54, and the contents of valid bit register 68 to the corresponding entry 48 of valid bit queue 46 (step 98). Write packer 40 also sets the corresponding entry 52 in same octaword queue 50 based on the state of flip flop 66 (step 100). If flip flop 66 is set (e.g., as a result of step 108), write packer 40 sets the entry 52. If flip flop 66 is not set (e.g., as a result of step 96), write packer 40 does not set the entry 52.

Next, write packer 40 loads the address information from internal address bus 26 into address register 60 (step 102). Write packer 40 resets valid bit register 68 to indicate that data register 58 contains no valid data (step 104). Write packer 40 then decrements input pointer 41 (step 105). Thereafter, write packer 40 loads the data from internal data bus 22 into data register 58 (step 90), sets the appropriate bits in valid bit register 68 (step 92), and waits for the next write packet to arrive (step 84).

The results of the procedure performed by write packer 40 are illustrated by the following example. Assuming that data queue 42 is empty and input pointer 41 is "8", write packer 40 loads the first write packet transferred from data register 58 into entry 44h of data queue 42.

Referring also to FIG. 2, assume that a write packet containing $DATA_1$ is addressed to $A_U$, the upper quadword of octaword A1, and that the packet is followed by a write packet containing $DATA_2$ addressed to $A1_L$, the lower quadword of octaword A1. When the first write packet arrives, write packer 40 loads $DATA_1$ into data register 58 (step 90), $A1_U$ into address register 60 (step 102), and valid mask 24 into valid bit register 68 (step 92).

When the second write packet arrives, write packer 40 loads $DATA_1$ into entry 44h of data queue 42 (the eighth entry, designated by input pointer 41) and $A1_U$ into entry 56h of address queue 54 (step 98). Because, as indicated by $A1_U$ and $A1_L$ (step 106), $DATA_1$ and $DATA_2$ are directed to the same octaword, write packer 40 sets entry 52h of data queue 50 (step 100). Also, if, for example, valid bit register 68 indicates that the first eight bits and the last eight bits of $DATA_1$ are valid, write packer 40 loads "10000001" into entry 48h of valid bit queue 46 (step 98). Write packer 40 then decrements input pointer 41 to "7" (step 105). Finally, write packer 40 loads $DATA_2$ into data register 58 (step 90), $A1_L$ into address register 60 (step 102), and valid mask 24 into valid bit register 68 (step 92).

When a third write packet containing $DATA_3$ and addressed to $A1_U$ arrives, write packer 40 loads $DATA_2$ into entry 44g of data queue 42 (the seventh entry) and $A1_L$ into entry 56g of address queue 54 (step 98). Even though, as indicated by $A1_L$ and $A1_U$, $DATA_2$ and $DATA_3$ are directed to the same octaword, write packer 40 does not set entry $52_g$ of data queue 50 (because entry 52h of data queue 50 is already set (step 94)). Assuming that valid bit register 68 indicates that the third eight bits and the fourth eight bits of $DATA_2$ are valid, write packer 40 loads "00110000" into entry 48g of valid bit queue 46 (step 98). Write packer 40 then decrements input pointer 41 to "6" (step 105). Finally, write packer 40 loads $DATA_3$ into data register 58 (step 90), $A1_U$ into address register 60 (step 102), and valid mask 24 into valid bit register 68 (step 92).

When a fourth write packet containing $DATA_4$ and addressed to $A5_U$ arrives, write packer 40 loads $DATA_3$ into entry 44f of data queue 42 (the sixth entry) and $A1_U$ into entry 56f of address queue 54 (step 98). Because $DATA_3$ and $DATA_4$ are directed to different octawords (step 106), write packer 40 sets neither entry 52f of data queue 50 nor flip flop 62. Assuming that valid bit register 68 indicates that the first thirty two bits of $DATA_3$ are valid, write packer 40 loads "11110000" into entry 48f of valid bit queue 46 (step 98). Next, write packer 40 decrements input pointer 41 to "5" (step 105). Write packer 40 then loads $DATA_4$ into data register 58 (step 90) and $A5_U$ into address register 60 (step 102). Assuming that valid mask 24 indicates that the last sixteen bits of $DATA_4$ are valid, write packer 40 loads "00000011" into valid bit register 68 (step 92).

Figure 4:
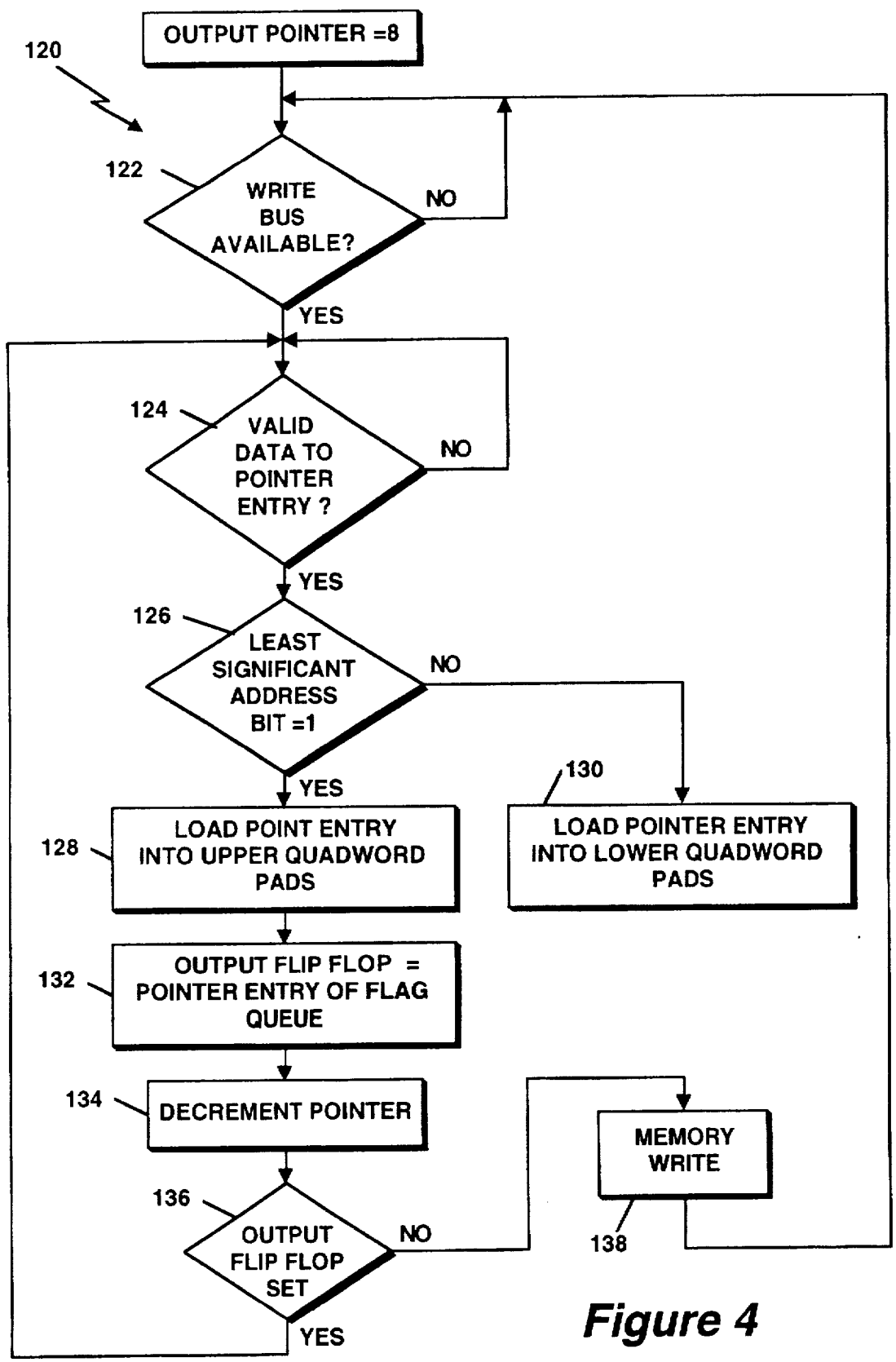
FIG. 4 is a flow chart illustrating the process for transferring data from the write queue of FIG. 2 to memory.

FIG. 4 shows the procedure 120 performed by output circuit 64. On startup, output circuit 64 sets output pointer 65 to "8" (step 121). Next, output circuit 64 waits for a signal 70 from memory 20 that external write bus 36 is available (step 122). Once external write bus 36 is available, output circuit 64 waits for valid data to appear in the entry 44 of data queue 42 designated by output pointer 65 (step 124).

When there is valid data in the entry 44 designated by output pointer 65, output circuit 64 examines the least significant bit 72 of the entry 56 of address queue 54 designated by output pointer 65 (step 126). If least significant bit 72 is set, output circuit 64 loads the data from the entry 44 designated by output pointer 65 into data pads 16a that correspond to the upper quadword of the external write bus 36 (step 128). Output circuit 64 performs the load by transferring the data from the entry 44 designated by output pointer 65 onto internal data write bus 30 and setting group select signal 32. Because group select signal 32 is set, upper quadword group of data pads 16a latches the data on internal data write bus 30.

If least significant bit 72 is not set, output circuit 64 loads the data from the entry 44 designated by output pointer 65 into lower quadword group of data pads 16*b* (step 130). Output circuit 64 performs the load by transferring the data from the entry 44 onto internal data write bus 30 without setting group select signal 32. Because group select signal 32 is not set, the lower quadword group of data pads 16*b* latches the data on internal data write bus 30.

While loading the data into the appropriate data pads 16 (steps 128, 130), output circuit 64 transfers address information from entry 56*h* of address queue 54 to address pads 18 via internal address write bus 34. It is important to note that internal address write bus 34 has one less bit (X−1) than internal address bus 26 (X) and the entries 56 of address queue 54 (X). This is because internal address bus 26 and entries 56 specify a quadword of data while internal address write bus 34 only specifies an octaword of data.

After loading the data into the appropriate data pads 16 (steps 128, 130), output circuit 64 examines same octaword queue 50 to determine if the entry 52 designated by output pointer 65 is set. If the entry 52 is not set, output circuit 64 generates a write signal 74 to memory 20 that signals memory 20 to perform a memory write. If the entry 52 is set, this indicates that the next entry 44 of data queue 42 contains data from the other quadword of the octaword to which the data in the entry 44 designated by output pointer 65 belongs. In this case, output circuit 64 waits until after loading the data from the entry 44 onto data pads 16 to signal a memory write.

Output circuit 64 determines whether to delay signalling a memory write in the following manner. First, output circuit 64 sets or resets the state of an output flip flop 76 to correspond to the state of the entry 52 of same octaword queue 50 designated by output pointer 65 (step 132). If the entry 52 is set, output circuit 64 sets output flip flop 76, and, if the entry 52 is not set, output circuit 64 does not set output flip flop 76. Output circuit 64 then decrements output pointer 65 so that output pointer 65 designates the next entry 44 in data queue 42 (step 134).

Next, output circuit 64 checks the state of output flip flop 76 (step 136). If output flip flop 76 is set, this indicates that the data in the entry 44 of data queue 42 now designated by output pointer 65 is directed to the same octaword as the data now loaded onto data pads 16. In this case, output circuit 64 transfers the data in the entry 44 now designated by output pointer 65 to data pads 16 by repeating the process performed on the data now loaded onto the data pads 16. Output circuit 64 begins this repetition by determining if the data in the entry 44 now designated by output pointer 65 is valid (step 124) and proceeding from there. For example, if the data in the entry 44 now designated by output pointer 65 is directed to the same octaword as the data loaded on data pads 16*a*, output circuit 64 transfers the data in the entry 44 now designated by output pointer 65 to data pads 16*b*.

If output flip flop 76 is not set, output circuit 64 generates write signal 74 that instructs memory 20 to perform a memory write (step 138). Thereafter, output circuit 64 proceeds to step 122 and waits for external write bus 36 to become available.

The results of the procedure performed by output circuit 64 are illustrated by the following example. With the entries in queue 14*a* as shown in FIG. 2 and output pointer 65 set to "8", output circuit 64 transfers $DATA_1$ from entry 44*h* of data queue 42 to data pads 16*a* via internal data write bus 30 (step 128). Because entry 56*h* of address queue 54 indicates that $DATA_1$ is directed to $A1_U$, the upper quadword of address A1, output circuit 64 sets signal 32. Signal 32 instructs the group of data pads 16*a* that correspond to the upper quadword of data pads 16 to latch $DATA_1$. While transferring $DATA_1$ to data pads 16*a*, output circuit 64 transfers address A1 to address pads 18 via internal address write bus 34 (step 128). Because entry 52*h* of same octaword queue 50 is set, output circuit 64 also sets flip flop 76 (step 132).

Output circuit 64 next decrements output pointer 65 to "7" (step 134). Because flip flop 76 is set (step 136), output circuit 64 transfers $DATA_2$ from entry 44*g* of data queue 42, to data pads 16*b* via internal data write bus 30 (step 130). Because entry 56*g* of address queue 54 indicates that $DATA_2$ is directed to $A1_L$, the lower quadword of address A1, output circuit 64 does not set signal 32. Because signal 32 is not set, the group of data pads 16*b* that correspond to the lower quadword of data pads 16 latch $DATA_2$. Because entry 52*g* of same octaword queue 50 is not set, output circuit 64 does not set flip flop 76 (step 132).

Output circuit 64 next decrements output pointer 65 to "6" (step 134). Because flip flop 76 is not set (step 136), output circuit 64 generates write signal 74 and the data on data pads 16*a*, 16*b* is written to memory 20 (step 138). Thus, $DATA_1$ and $DATA_2$ are written to memory 20 in a single write cycle.

If write packer 40 had set both entry 52*h* and entry 52*g* of same octaword queue 50, output circuit 64 would have written $DATA_3$ to data pads 16*a*, which would have overwritten $DATA_1$. Because the last eight bits of $DATA_3$ are invalid while the last eight bits of $DATA_1$ are valid, the overwriting of $DATA_1$ by $DATA_3$ would have resulted in a loss of valid data. This situation highlights the advantage of not permitting write packer 40 to set two consecutive entries 52 in same octaword queue 50.

As shown above, the implementation of internal storage 14 as write queue 14*a* allows the width of entries 44 of data queue 42 to be drastically reduced (in this embodiment, by half) without increasing the number of write cycles needed to write data to memory 20. As such, write queue 14*a* is an area efficient internal storage 14.

Other embodiments are within the following claims.

Figure 5:
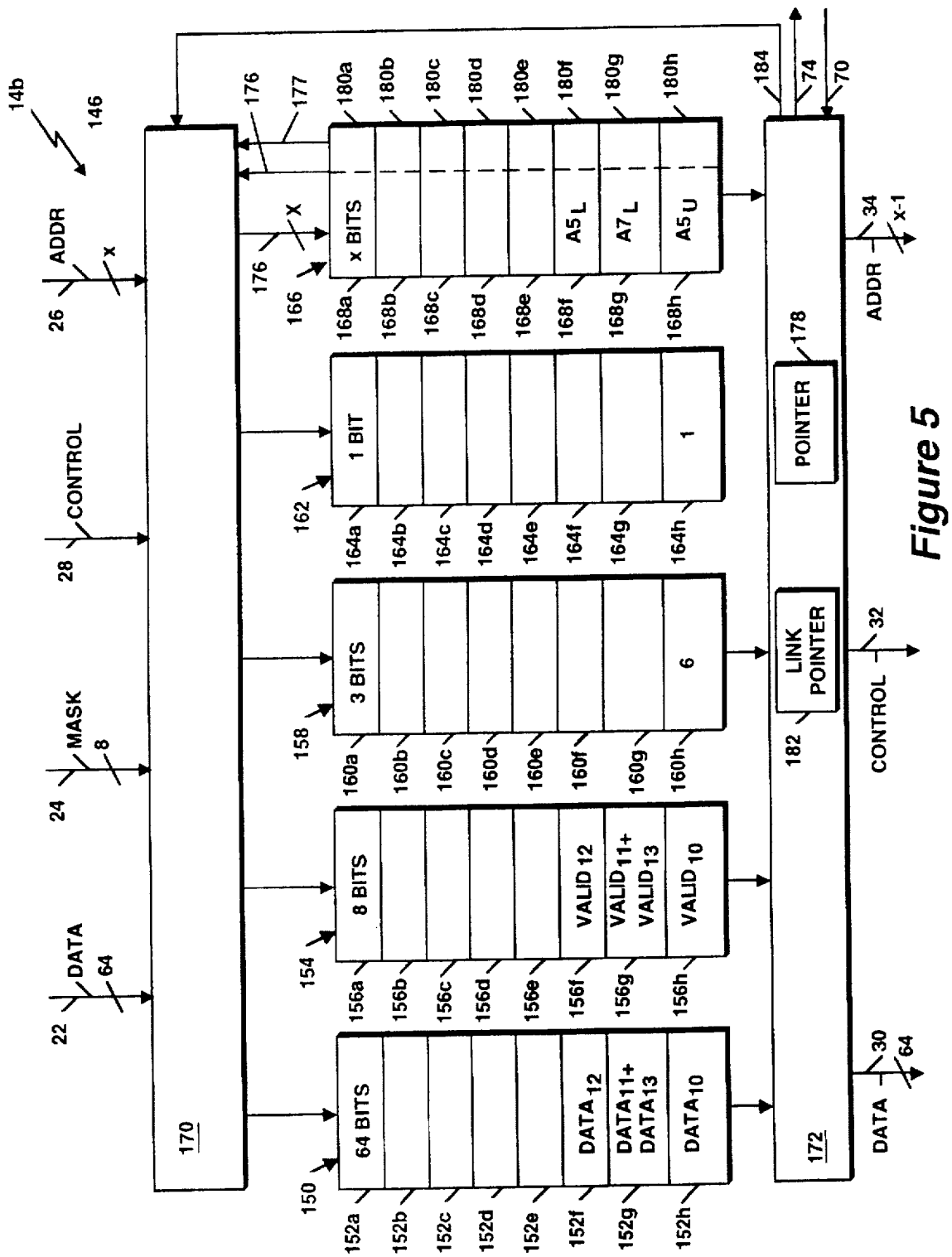
FIG. 5 shows a write buffer according to another embodiment of the invention.

For example, referring to FIG. 5, internal storage 14 could be implemented as a write buffer 14*b*. Buffer 14*b* includes a data buffer 150 that temporarily stores the data from write packets sent by processing element 12. Data buffer 150 includes eight entries 152*a*–152*h* (generally referred to as 152). As with entries 44 of data queue 42, each entry 152 of data buffer 150 is 64 bits wide. Thus, buffer 14*b* achieves the same area efficiency achieved by queue 14*a*.

A CAM (Content Addressable Memory) 166 stores the addresses that correspond to the data stored in data buffer 150. CAM 166 includes eight entries 168*a*–168*h*, each of which corresponds to an entry 152 in data buffer 150.

Like write packer 40, an input control circuit 170 consolidates writes to the same address. However, unlike write packer 40, input control circuit 170 does not combine only consecutive writes. Instead, input control circuit 170 combines any write to an address stored in an entry 168 of CAM 166. Input control circuit 170 uses valid signal 28 and the entry 156 in the valid bit buffer 154 that corresponds to the address to determine which data from internal data bus 22 input control circuit 170 will combine with the data in the entry 152 of data buffer 150 that corresponds to the address.

When processing element 12 sends a write packet to buffer 14*b*, input control circuit 170 sends the address from address bus 26 to CAM 166 via CAM address lines 174. CAM 166 returns a signal 176 that indicates the relationship that the address on CAM address lines 174 has with the contents of CAM 166. Signal 176 indicates one of three conditions: hit, near-miss, and miss.

When signal 176 indicates a hit, the new write packet is directed to the same quadword as an entry 168 in CAM 166. In this case, an entry indicator 177 indicates which entry 168 contains the address on CAM address lines 174.

When signal 176 indicates a near-miss, the new write packet is not directed to the same quadword as an entry 168 in CAM 166, but the new write packet is directed to the same octaword as an entry 168 in CAM 166. In this case, entry indicator 177 indicates which entry 168 contains the alternate quadword of the address on CAM address lines 174.

When signal 176 indicates a miss, the new write packet is directed to an octaword for which neither quadword is contained in an entry 168 in CAM 166.

If signal 176 indicates a hit, input control circuit 170 combines the data from data bus 22 with the contents of the entry 152 of data buffer 150 that corresponds to the entry 168 of CAM 166 indicated by signal 176. Data is combined by merging valid data from internal data bus 22 into the selected entry 152. After updating the selected entry 152, the corresponding entry 156 in valid bit buffer 154 is updated.

If signal 176 indicates a miss or a near-miss, input control circuit 170 loads the address on CAM address lines 174 into an empty entry 168 of CAM 166. Next, input control circuit 170 loads the data from internal data bus 22 into the entry 152 of data buffer 150 that corresponds to the entry 168 in which the address on CAM address lines 174 has been loaded. Input control circuit 170 loads valid mask 24 into the corresponding entry 156 of valid bit buffer 154.

If signal 176 indicates a near-miss, input control circuit 170 needs to associate the entry 152 of data buffer 150 the new write packet with the entry 152 containing data directed to the alternate quadword of the same octaword as the new write packet. To do this, input control circuit 170 sets the entry 164 in a link bit buffer 162 that corresponds to the entry 168 in CAM 166 indicated by entry indicator 177. Input control circuit 170 then selects the entry 160 in a link address buffer 158 that corresponds to the entry 168 in CAM 166 indicated by entry indicator 177. Input control circuit 170 then loads a value in the selected entry 160 that corresponds to the entry 168 in CAM 166 in which the address of the new write packet has been loaded. For example, if entry indicator 177 indicated entry 168g (the seventh entry), and the address on CAM address lines 174 had been loaded into entry 168d (the fourth entry), input control circuit 170 would load "4" into entry 160g of link address buffer 158. A set entry 164 in link bit buffer 162 indicates that the corresponding data entry 152 is part of an octaword, the other part of which is stored in a second data entry; the value loaded in the corresponding entry 160 of link address buffer 158 identifies the second data entry. Thus, by setting an entry 164 in link bit buffer 162 and loading an entry 160 in link address buffer 158, input control circuit 170 creates a link between entries 152 in data buffer 150 that contain alternate quadwords of a single octaword.

Figure 6:
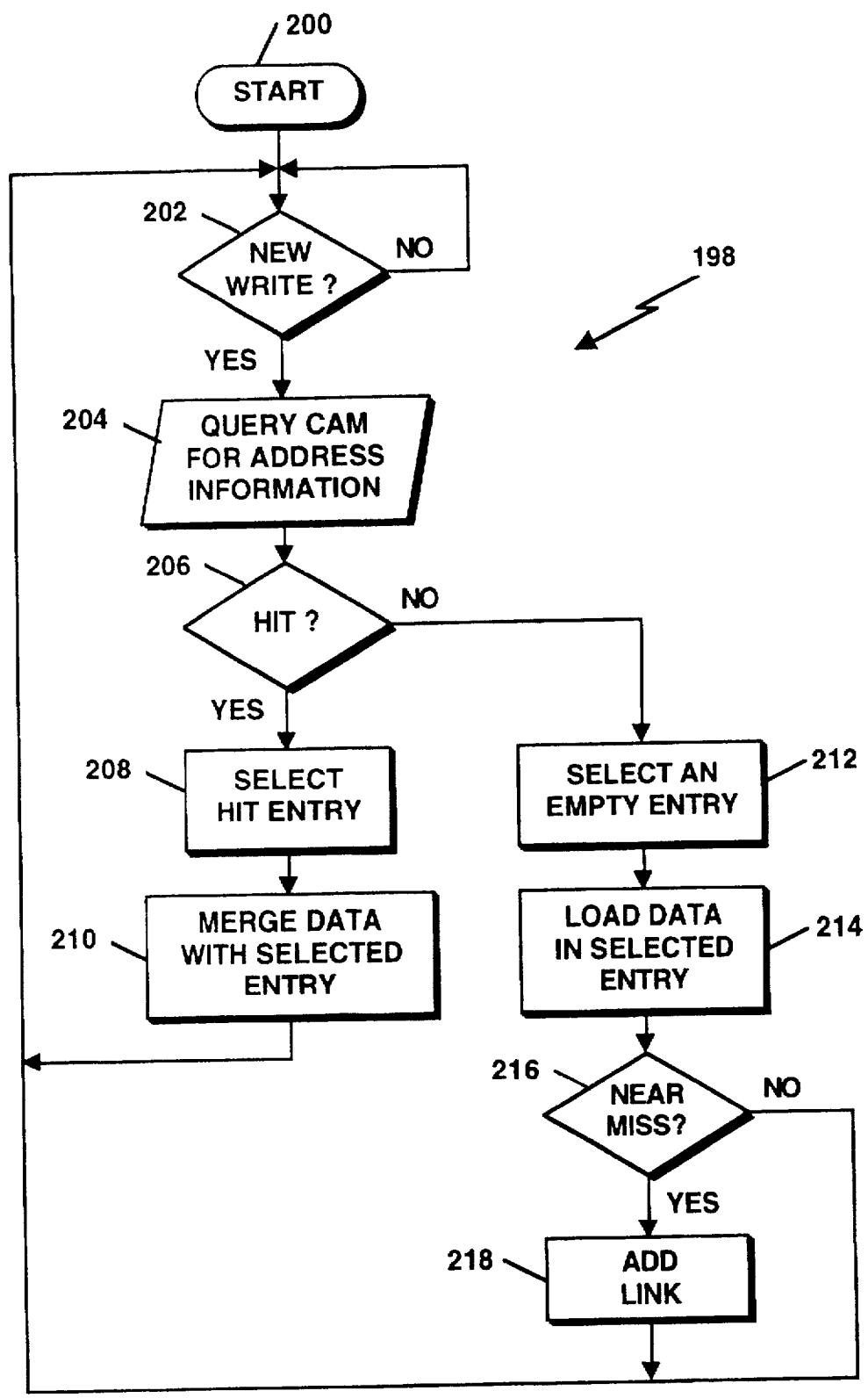
FIG. 6 is a flow chart that shows the procedure for writing data to the write buffer of FIG. 5.

FIG. 6 shows the procedure 198 performed by input control circuit 170. After startup (step 200), input control circuit 170 waits (step 202) to receive a control signal 28 from processing element 12 that indicates that a new write packet has arrived.

When a new write packet arrives, input control circuit 170 queries CAM 166 with address information from internal address bus 26 (step 204). Input control circuit 170 does this by sending the address information to the CAM 166 via CAM address lines 174. CAM 166 replies with signal 176 and entry indicator 177. Signal 176 indicates either a hit, a near-miss, or a miss. When signal 176 indicates a hit, entry indicator 177 indicates the entry 168 in CAM 166 that contains the address of the new write packet. When signal 176 indicates a near-miss, entry indicator 177 indicates the entry 168 in CAM 166 that contains the alternate quadword of the octaword of the new write packet.

If signal 176 indicates a hit (step 206), input control circuit 170 selects the entry 152 in data buffer 150 that corresponds to the entry 168 in address buffer 166 indicated by entry indicator 177 (step 208). Input control circuit 170 then adds the valid data from data bus 22 to the selected entry 152 and updates the corresponding entry 156 in the valid bit buffer 154 based on valid mask 24 (step 210). Input control circuit 170 then waits to receive control signal 28, which indicates that a new write packet has arrived, from processing element 12 (step 202).

If signal 176 indicates a near-miss or a miss (step 206), input control circuit 170 selects an empty entry 152 in data buffer 150 (step 212). When selecting an empty entry 152, input control circuit 170 selects the empty entry 152 that is directly above the last occupied entry 152. Thus, if entries 152e–152g contained data and entries 152a–152d and 152h were empty, input control circuit 170 would select entry 152d. Input control circuit 170 then loads the data from data bus 22 to the selected entry 152 and loads valid mask 24 into the corresponding entry 156 in the valid bit buffer 154 (step 214).

Next, if signal 176 indicates a near-miss (step 216), input control circuit 170 creates a link as described above (step 218). First, input control circuit 170 sets the entry 164 in link bit buffer 162 that corresponds to the pre-existing, near-missed entry 168 in CAM 166 indicated by entry indicator 177. Next, input control circuit 170 selects an entry 160 in link address buffer 158 that corresponds to the entry 168 in CAM 166 indicated by entry indicator 177. In this selected entry 160, input control circuit 170 loads a value that corresponds to the entry 152 in data buffer 150 in which the data on internal data bus 22 has been loaded. Input control circuit 170 then waits to receive control signal 28, which indicates that a new write packet has arrived, from processing element 12 (step 202).

The results of the procedure performed by input control circuit 170 are illustrated by the following example. With data buffer 150 initially empty, a write packet containing $DATA_{10}$ and addressed to $A5_U$, the upper quadword of octaword A5, arrives from processing element 12. Input control circuit 170 queries CAM 166 with "$A5_U$" via CAM address lines 174 (step 204). CAM 166 replies with signal 176, which indicates a miss. Because signal 176 indicates a miss, input control circuit 170 selects empty entry 152h in data buffer 150 (step 212) and loads $DATA_{10}$ (step 214). While loading $DATA_{10}$, input control circuit 170 loads valid information, $VALID_{10}$, from valid mask 24 into entry 156h of valid bit buffer 156 (step 214). Input control circuit 170 also resets entry 164h of link bit buffer 162 and loads $A5_U$ into entry 168h of CAM 166 (step 214).

Next, a write packet containing $DATA_{11}$ and addressed to $A7_L$, the lower quadword of octaword A7, arrives from processing element 12. Input control circuit 170 queries CAM 166 with $A7_L$ via CAM address lines 174 (step 204). CAM 166 replies with signal 176, which indicates a miss. Because signal 176 indicates a miss, input control circuit 170 selects empty entry 152g in data buffer 150 (step 212) and loads $DATA_{11}$ (step 214). While loading $DATA_{11}$, input control circuit 170 loads valid information, $VALID_{11}$, from valid mask 24 into entry 156g of valid bit buffer 156 (step 214). Input control circuit 170 also resets entry 164g of link bit buffer 162 and loads $A7_L$ into entry 168g of CAM 166 (step 214).

Next, a write packet containing $DATA_{12}$ and addressed to $A5_L$, the lower quadword of octaword A5, arrives from processing element 12. Input control circuit 170 queries CAM 166 with $A5_L$ via CAM address lines 174 (step 204). CAM 166 replies with signal 176, which indicates a near-miss, and entry indicator 177, which is set to "8" and therefore indicates that the near-miss address is located in entry 168h (the eighth entry). Because signal 176 indicates a near-miss, input control circuit 170 selects empty entry 152f in data buffer 150 (step 212) and loads $DATA_{12}$ (step 214). While loading $DATA_{12}$, input control circuit 170 loads valid information, $VALID_{12}$, from valid mask 24 into entry 156f of valid bit buffer 156 (step 214). Input control circuit 170 also resets entry 164f of link bit buffer 162 and loads $A5_L$ into entry 168f of CAM 166 (step 214).

Because signal 176 indicates a near-miss, input control circuit 170 makes a link between entries 168h and 168f of CAM 166. First, input control circuit 170 sets entry 164h in link bit buffer 162 (as indicated by entry indicator 177). Next, input control circuit 170 loads "6" into entry 160h of link address buffer 158 (entry 168f is the sixth entry in CAM 166).

Finally, a write packet containing $DATA_{13}$ and addressed to $A7_L$, the lower quadword of octaword A7, arrives from processing element 12. Input control circuit 170 queries CAM 166 with $A7_L$ via CAM address lines 174 (step 204). CAM 166 replies with signal 176, which indicates a hit, and entry indicator 177, which is set to "7" and therefore indicates that the hit address is located in entry 168g (the seventh entry). Because signal 176 indicates a hit, input control circuit 170 selects entry 152g in data buffer 150 (the seventh entry) (step 208), and merges $DATA_{13}$ with $DATA_{11}$ (step 210). While merging $DATA_{13}$ with $DATA_{11}$, input control circuit 170 merges valid information, $VALID_{11}$, from entry 156g of valid bit buffer 156 with valid information, $VALID_{13}$, from valid mask 24 (step 210). Input control circuit 170 does not reset entry 164g of link bit buffer 162 or load $A7_L$ into entry 168g of CAM 166 (step 210).

Figure 7:
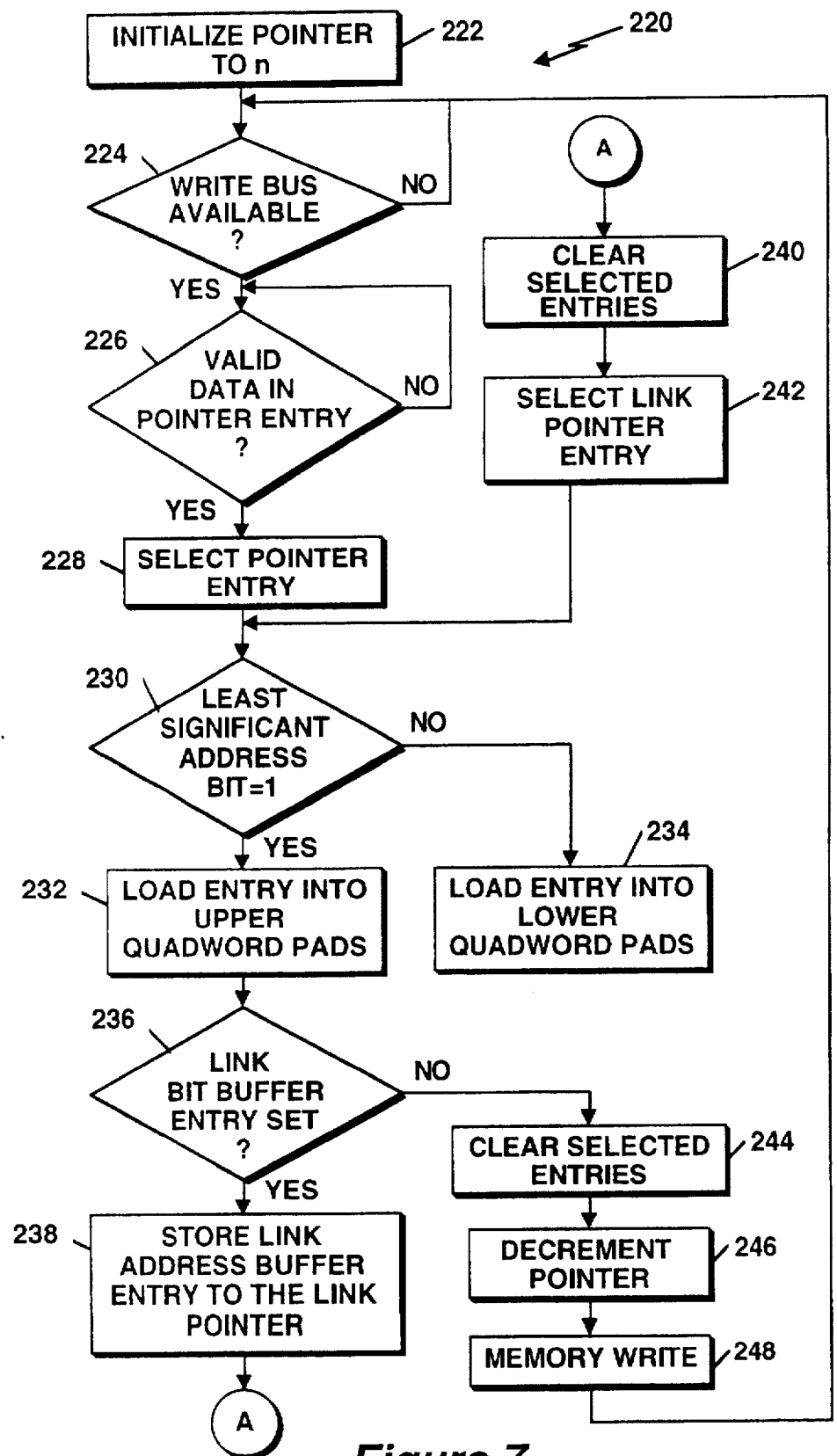
FIG. 7 is a flow chart illustrating the process for transferring data from the write buffer of FIG. 5 to memory.

FIG. 7 shows the procedure 220 performed by output control circuit 172. On startup, output control circuit 172 initializes a pointer 178 to "n", the number of entries in data buffer 150 (step 222). In this example, n is equal to eight. After initializing pointer 178, output control circuit 172 waits for signal 70 from memory 20 indicating that external write bus 36 is available (step 224).

Once external write bus 36 is available, output control circuit 172 waits for valid data to appear in the entry 152 of data buffer 150 identified by pointer 178 (step 226). In this example, pointer 178 is set to "8", and therefore points to entry 152h (the eighth entry 152 in data buffer 150). Output control circuit 172 checks for valid data in entry 152h by monitoring entry 156h in valid bit buffer 154. If any bit in entry 156h is set to "1", this indicates that there is valid data in entry 152h.

When there is valid data in entry 152h (the entry 152 of data buffer 150 identified by pointer 178), output control circuit 172 selects entry 152h (step 228). Upon selecting entry 152h, output control circuit 172 sends a signal 184 to input control circuit 170. Signal 184, which is set to "8" because entry 152h is the eighth entry, prevents input control circuit 170 from modifying the data in entry 152h.

Next, output control circuit 172 determines which set of data pads (16a or 16b) are to latch the data from entry 152h. To do so, output control circuit 172 examines the least significant bit 180h of address entry 168h (the entry 168 of CAM 166 identified by pointer 178) (step 230). If least significant bit 180h is set, output control circuit 172 loads the data from entry 152h of data buffer 150 into pads 16a that correspond to the upper quadword of external write bus 36 (step 232). Output control circuit 172 performs the load by transferring the data from entry 152h onto internal data write bus 30 and setting group select signal 32. If group select signal 32 is set, upper quadword group of data pads 16a latches the data on internal data write bus 30.

If least significant bit 180h is not set, output control circuit 172 loads the data from entry 152h of data buffer 42 into data pads 16b that correspond to the lower quadword of external write bus 36 (step 234). Output control circuit 172 performs the load by transferring the data from entry 152h onto internal data write bus 30 without setting group select signal 32. If group select signal 32 is not set, lower quadword group of data pads 16b latches the data on internal data write bus 30.

After loading the data onto data pads 16a or 16b (steps 232, 234), output control circuit 172 determines whether the data is linked to another entry 152 in the data buffer 150. If so, output control circuit 172 delays writing the data to memory 20 until output control circuit 172 has transferred the data from the linked entry 152 to the remaining data pads 16a or 16b. If there is no link, output control circuit writes the data to memory 20 (step 248).

To determine if the data is linked to another entry 152 in the data buffer 150, output control circuit 172 examines entry 164h (the entry 164 of link bit buffer 162 that corresponds to pointer 178) (step 236). If entry 164h is set, output control circuit 172 stores the value of entry 160h (the entry 160 of link address buffer 158 identified by pointer 178) in link pointer 182 (step 238). Output control circuit 172 then clears entries 152h, 156h, 160h, 164h, and 168h (the entries identified by pointer 178) (step 240). Next, output control circuit 172 selects the entry 152 in data buffer 150 that is identified by link pointer 182 by sending a signal 184 to input control circuit 170 that identifies the entry 152 (step 242), and thereby prevents input control circuit 170 from modifying the data in that entry 152. Thereafter, output control circuit 172 proceeds to step 230.

If entry 164h of link bit buffer 162 is not set, output control circuit 172 clears entries 152h, 156h, 160h, 164h, and 168h (the entries identified by pointer 178) (step 244). Output control circuit 172 then decrements pointer 178 (step 246). Finally, output control circuit 172 generates write signal 74, and writes the data on data pads 16 to memory 20 in one write cycle (step 248).

The results of the procedure performed by output control circuit 172 are illustrated by the following example. With the entries in buffer 14b as shown in FIG. 5, output control circuit 172 initializes pointer 178 to "8" (step 222). Thereafter, output control circuit 172 transfers $DATA_{10}$, which is located in entry 152h (the eighth entry 152 of data buffer 150 and identified by pointer 178), to data pads 16a via internal data write bus 30 (step 232). Because entry 168h of CAM 166 indicates that $DATA_{10}$ is directed to the upper quadword of address A5, output control circuit 172 sets signal 32, which instructs the group of data pads 16a that correspond to the upper quadword of data pads 16 to latch $DATA_{10}$. While transferring $DATA_{10}$ to data pads 16a, output control circuit 172 transfers address A5 to address pads 18 via internal address write bus 34 (step 232).

Because entry 164h of link bit buffer 162 is set (step 236), output control circuit 172 stores "6", the value of entry 160h of link address buffer 158, in link pointer 182 (step 238). Output control circuit 172 then clears entries 152h, 156h, 160h, 164h, and 168h (step 240).

Next, output control circuit 172 transfers $DATA_{12}$, which is located in entry 152f (the sixth entry 152 of data buffer 150 and identified by link pointer 182), to data pads 16b via internal data write bus 30 (step 234). Because entry 168f of CAM 166 indicates that $DATA_{12}$ is directed to the lower quadword of address A5, output control circuit 172 does not set signal 32. This instructs the group of data pads 16b that correspond to the lower quadword of data pads 16 to latch $DATA_{12}$.

Because entry 164f of link bit buffer 162 is not set (step 236), output control circuit 172 clears entries 152f, 156f, 160f, 164f, and 168f (step 244). Next, output control circuit 172 decrements pointer 178 (step 246). Thus, the value of pointer 178 is now "7". Finally, output control circuit 172 writes $DATA_{10}$ and $DATA_{12}$ to memory in a single write cycle (step 248).

When external data write bus 36 becomes available, output control circuit 172 transfers the combination of $DATA_{11}$ and $DATA_{13}$, which is located in entry 152g (the seventh entry 152 of data buffer 150 and identified by pointer 178), to data pads 16b via internal data write bus 30 (step 234). Because entry 168g of CAM 166 indicates that the combination of $DATA_{11}$ and $DATA_{13}$ is directed to the lower quadword of address A7, output control circuit 172 does not set signal 32. This instructs the group of data pads 16b that correspond to the lower quadword of data pads 16 to latch the combination of $DATA_{11}$ and $DATA_{13}$. While transferring the combination of $DATA_{11}$ and $DATA_{13}$ to data pads 16b, output control circuit 172 transfers address A7 to address pads 18 via internal address write bus 34 (step 234).

Because entry 164g of link bit buffer 162 is not set (step 236), output control circuit 172 clears entries 152g, 156g, 160g, 164g, and 168g (step 244). Next, output control circuit 172 decrements pointer 178 (step 246). Thus, the value of pointer 178 is now "6". Finally, output control circuit 172 writes the combination of $DATA_{11}$ and $DATA_{13}$ to memory 20 (step 248).

While the length of the data entries in each of the embodiments discussed above is 64 bits, the length of data entries in other embodiments of the invention could be other than 64 bits. Moreover, the width of the external address bus could be divided into more than two entries. For example, assuming that the external address bus is 128 bits wide, the data entries could each be 32 bits, or even 16 bits, wide. Also, internal storage 14 could be implemented with other than eight entries.

What is claimed is:

1. A method for storing information in temporary storage and subsequently transferring the information to a memory over a bus, comprising providing a temporary storage having a plurality of entries and a plurality of multi-bit address entries, wherein a different multi-bit address entry is associated with each entry of the plurality of entries and wherein a size of each entry of the plurality of entries is smaller than a size of said bus;

storing information that is designated for a common area of said memory in different ones of said plurality of entries by:

receiving said information from a processing element in successive packets each of which has an address provided by said processing element, storing a received packet in a first one of said plurality of entries, and determining whether said packets are designated for said common area based on the addresses of each packet;

establishing said link between said first one of said plurality of entries and a second one of said plurality of entries in which a previously received packet is stored if the address of said received packet has a predetermined relationship with the address of said previously received packet; and assembling said information from said different ones of said plurality of entries between which said link has been established and transferring information that is so assembled together over said bus to said memory, wherein said common area comprises an entry of said memory, and further comprising determining that addresses have said predetermined relationship if the addresses identify different portions of said entry of said memory.

2. A method for storing information in temporary storage and subsequently transferring the information to a memory over a bus, comprising providing a temporary storage having a plurality of entries and a plurality of multi-bit address entries, wherein a different multi-bit address entry is associated with each entry of the plurality of entries and wherein a size of each entry of the plurality of entries is smaller than a size of said bus, storing information that is designated for a common area of said memory in different ones of said plurality of entries and establishing a link between said different ones of said plurality of entries, the storing including receiving said information from a processing element in successive packets each of which has an address provided by said processing element, and determining whether said packets are designated for said common area based on the addresses of each packet, and assembling said information from said different ones of said plurality of entries between which said link has been established and transferring information that is so assembled together over said bus to said memory, wherein said assembling step includes removing a first packet of information from one entry of said plurality of entries, determining whether said link has been established between said one entry and a second entry of said plurality of entries, and if said link has been established, removing a second packet of information from said second entry and then transferring said first packet and said second packet together over said bus to said memory.

3. The method of claim 2 further comprising, if said link has not been established, transferring said first packet over said bus to said memory, and then removing another packet from another entry of said plurality of entries.

4. The method of claim 2 wherein said temporary storage includes a queue of said plurality of, and further comprising storing said information in said queue and removing said information from said queue in first-in-first-out order.

5. The method of claim 2 wherein said temporary storage comprises a write buffer of said plurality of entries, and further comprising storing said information in said plurality of entries and removing said information from said plurality of entries in a preselected order that is not dependent on an order in which said information is received by said temporary storage.

6. A method for storing information in temporary storage and subsequently transferring the information to a memory over a bus, comprising providing a temporary storage having a plurality of entries and a plurality of multi-bit address entries, wherein a different multi-bit address entry is associated with each entry of the plurality of entries and wherein a size of each entry of the plurality of entries is smaller than a size of said bus, storing information that is designated for a common area of said memory in different ones of said plurality of entries and establishing a link between said different ones of said plurality of entries, and assembling said information from said different ones of said plurality of entries between which said link has been established and transferring information that is so assembled together over said bus to said memory, wherein said temporary storage includes a queue of said plurality of entries, and further comprising storing said information in said queue and removing said information from said queue in first-in-first-out order, the method further comprising receiving said information from a processing element in successive packets each of which has an address provided by said processing element, storing said packets received from the processing element in order in successive ones of said plurality of entries, determining whether the address of a currently received packet is related to the address of a previously received packet and, if the addresses are related, establishing said link between a first entry in which said currently received packet is stored and a second entry in which said previously received packet is stored.

7. The method of claim 6 further comprising using a field associated with one of said first entry and said second entry for said link.

8. The method of claim 7 further comprising using a field associated with said second entry for said link, and establishing said link by setting said field to a predetermined condition.

9. The method of claim 6 wherein said second entry is adjacent to said first entry in said queue and said assembling step includes removing a first packet of information from said first entry of said queue, determining whether said link has been established between said first entry and said second entry of said queue, if said link has been established, removing a second packet of information from said second entry and then transferring said first packet and said second packet together over said bus to said memory, and if said link has not been established, transferring said first packet over said bus to said memory, and then removing a packet from said second entry.

10. The method of claim 9 further comprising using a field associated with said first entry for said link, and determining whether said link has been established by determining whether said field has been set to a predetermined condition.

11. A method for storing information in temporary storage and subsequently transferring the information to a memory over a bus, comprising providing a temporary storage having a plurality of entries and a plurality of multi-bit address entries, wherein a different multi-bit address entry is associated with each entry of the plurality of entries and wherein a size of each entry of the plurality of entries is smaller than a size of said bus, storing information that is designated for a common area of said memory in different ones of said plurality of entries and establishing a link between said different ones of said plurality of entries, and assembling said information from said different ones of said plurality of entries between which said link has been established and transferring information that is so assembled together over said bus to said memory, wherein said temporary storage comprises a write buffer of said plurality of entries, and further comprising storing said information in said plurality of entries and removing said information from said plurality of entries in a preselected order that is not dependent on an order in which said information is received by said temporary storage, the method further comprising receiving said information from a processing element in successive packets each of which has an address provided by said processing element, storing said packets received from the processing element in said preselected order in different ones of said plurality of entries, determining if the address of a currently received packet is related to the address of a previously received packet and, if the addresses are related, establishing said link between a first entry in which said currently received packet is stored and a second entry in which said previously received packet is stored.

12. The method of claim 11 further comprising using a field associated with one entry of said first and second entries to indicate that said first and second entries are linked, and providing said one entry with an index that identifies an entry in said write buffer to which said one entry is linked.

13. The method of claim 12 further comprising using the field and index associated with said second entry for said link, and establishing said link by setting said field to a predetermined condition, and setting said index to identify a position in said write buffer of the first entry relative to a position in said write buffer of the second entry.

14. The method of claim 11 wherein said assembling step includes removing a first packet of information from a selected entry of said plurality of entries of said write buffer, determining whether said link has been established between said selected entry and a second entry of said write buffer, if said link has been established, using said link to locate said second entry in said write buffer, removing a second packet of information from said second entry, and then transferring said first packet and said second packet together over said bus to said memory, and if said link has not been established, transferring said first packet over said bus to said memory, and then removing another packet from another one of said entries of said write buffer.

15. The method of claim 14 further comprising using a field associated with said selected entry to indicate whether said selected entry is linked to an additional entry in said write buffer, and providing said selected entry with an index that identifies a position in said write buffer of said an additional entry relative to a position of said selected entry.

16. Apparatus for temporarily storing information and subsequently transferring the information to a memory over a bus, comprising storage that includes a plurality of entries and a plurality of multi-bit address entries, wherein a different multi-bit address entry is associated with each entry of the plurality of entries and wherein a size of each entry of the plurality of entries is smaller than a size of said bus, an input controller for storing said information that is designated for a common area of said memory in different entries of said plurality of entries and establishing a link between said different entries, the input controller including means for receiving said information from a processing element in successive packets each of which has an address provided by said processing element and means for determining whether said packets are designated for said common area based on the address of each of said packets, and an output controller for assembling said information from said different entries between which a link has been established and transferring the information that is so assembled together over said bus to said memory, wherein said means for receiving stores a received packet in a first entry of said plurality of entries, and said means for determining establishes said link between said first entry and a second entry in which a previously received packet is stored if the address of said received packet has a predetermined relationship with the address of said previously received packet, wherein said common area includes an entry of said memory and addresses have said predetermined relationship if the addresses identify different portions of said entry of said memory.

17. Apparatus for temporarily storing information and subsequently transferring the information to a memory over a bus, comprising storage that includes a plurality of entries and a plurality of multi-bit address entries, wherein a different multi-bit address entry is associated with each entry of the plurality of entries and wherein a size of each entry of the plurality of entries is smaller than a size of said bus, an input controller for storing said information that is designated for a common area of said memory in different entries of said plurality of entries and establishing a link between said different entries, the input controller including means for receiving said information from a processing element in successive packets each of which has an address provided by said processing element and means for determining whether said packets are designated for said common area based on the address of each of said packets, and an output controller for assembling said information from said different entries between which a link has been established and transferring the information that is so assembled together over said bus to said memory, wherein said output controller includes means for removing a first packet of information from one entry of said plurality of entries, and means for determining whether said link has been established between said one entry and a second entry of said plurality of entries, and if said link has been established, causing said output controller to remove a second packet of information from said second entry and then transfer said first packet and said second packet together over said bus to said memory.

18. The apparatus of claim 17 wherein, if said link has not been established, said means for determining causes said output controller to transfer said first packet over said bus to said memory and then remove another packet from another one of said plurality of entries.

19. The apparatus of claim 17 wherein said temporary storage comprises a queue of said plurality of entries, said input controller storing said information in said queue and removing said information from said queue in first-in-first-out order.

20. The apparatus of claim 17 wherein said temporary storage comprises a write buffer of said plurality of entries, said input controller storing said information in said plurality of entries and removing said information from said plurality of entries in a preselected order that is not dependent on an order in which said information is received by said temporary storage.

21. Apparatus for temporarily storing information and subsequently transferring the information to a memory over a bus, comprising storage that includes a plurality of entries and a plurality of multi-bit address entries, wherein a different multi-bit address entry is associated with each entry of the plurality of entries and wherein a size of each entry of the plurality of entries is smaller than a size of said bus, an input controller for storing said information that is designated for a common area of said memory in different entries of said plurality of entries and establishing a link between said different entries, and an output controller for assembling said information from said different entries between which a link has been established and transferring the information that is so assembled together over said bus to said memory, wherein said temporary storage comprises a queue of said plurality of entries, said input controller storing said information in said queue and removing said information from said queue in first-in-first-out order, the apparatus further comprising means for receiving said information from a processing element in successive packets each of which has an address provided by said processing element and storing said packets received from the processing element in order in successive ones of said plurality of entries, and means for determining whether the address of a currently received packet is related to the address of a previously received packet and, if the addresses are related, establishing said link between a first entry in which said currently received packet is stored and a second entry in which said previously received packet is stored.

22. The apparatus of claim 21 wherein said queue includes a field associated with each one of said plurality of entries, wherein said field is operable in establishing said link.

23. The apparatus of claim 22 wherein said input controller uses the field associated with said second entry for said link, and establishes said link by setting said field to a predetermined condition.

24. The apparatus of claim 21 wherein said second entry is adjacent to said first entry in said queue and said output controller includes means for removing a first packet of information from said first entry of said queue, and means for determining whether said link has been established between said first entry and said second entry of said queue, said means for determining causing said output controller to remove a second packet of information from said second entry and to transfer said first packet and said second packet together over said bus to said memory if said link has been established, and said means for determining causing said output controller to transfer said first packet over said bus to said memory and then to remove another packet from said second entry if said link has not been established.

25. The apparatus of claim 24 wherein said queue includes a field associated with each one of said plurality of entries to provide said link, said means for determining detecting whether the field associated with said first entry has been set to said predetermined condition to determine whether said link has been established.

26. Apparatus for temporarily storing information and subsequently transferring the information to a memory over a bus, comprising storage that includes a plurality of entries and a plurality of multi-bit address entries, wherein a different multi-bit address entry is associated with each entry of the plurality of entries and wherein a size of each entry of the plurality of entries is smaller than a size of said bus, an input controller for storing said information that is designated for a common area of said memory in different entries of said plurality of entries and establishing a link between said different entries, and an output controller for assembling said information from said different entries between which a link has been established and transferring the information that is so assembled together over said bus to said memory, wherein said temporary storage comprises a write buffer of said plurality of entries, said input controller storing said information in said plurality of entries and removing said information from said plurality of entries in a preselected order that is not dependent on an order in which said information is received by said temporary storage the apparatus further comprising means for receiving said information from a processing element in successive packets each of which has an address provided by said processing element and storing said packets received from the processing element in said preselected order in different ones of said plurality of entries, and means for determining if the address of a currently received packet is related to the address of the previously received and stored packet and, if the addresses are related, establishing said link between a first entry in which said currently received packet is stored and a second entry in which said previously received packet is stored.

27. The apparatus of claim 26 wherein said write buffer includes a field associated with each one of said plurality of entries to provide said link and an index that identifies the entry in said write buffer to which an entry is linked, said input controller using said field associated with one entry of said first and second entries to indicate that said first and second entries are linked and providing said one entry with an index that identifies an entry in said write buffer to which said one entry is linked.

28. The apparatus of claim 27 wherein said input controller uses the field and index associated with said second entry for said link and establishes said link by setting said field to a predetermined condition, and setting said index to identify a position in said write buffer of the first entry relative to a position in said write buffer of the second entry.

29. The apparatus of claim 26 wherein said output controller includes means for removing a first packet of information from a selected one entry of said write buffer, means for determining whether said link has been established between said selected one entry and an additional entry of said write buffer, said means for determining using said link to locate said additional entry in said write queue, removing a second packet of information from said additional entry, and then transferring said first packet and said second packet together over said bus to said memory if said link has been established, and transferring said first packet over said bus to said memory, and then removing another packet from another entry of said write buffer if said link has not been established.

30. The apparatus of claim 29 wherein said write buffer includes a field associated with each one entry of said plurality of entries to provide said link and an index that identifies a position in the write buffer of an entry to which said one entry of said plurality of entries is linked.

* * * * *